Figure 1:
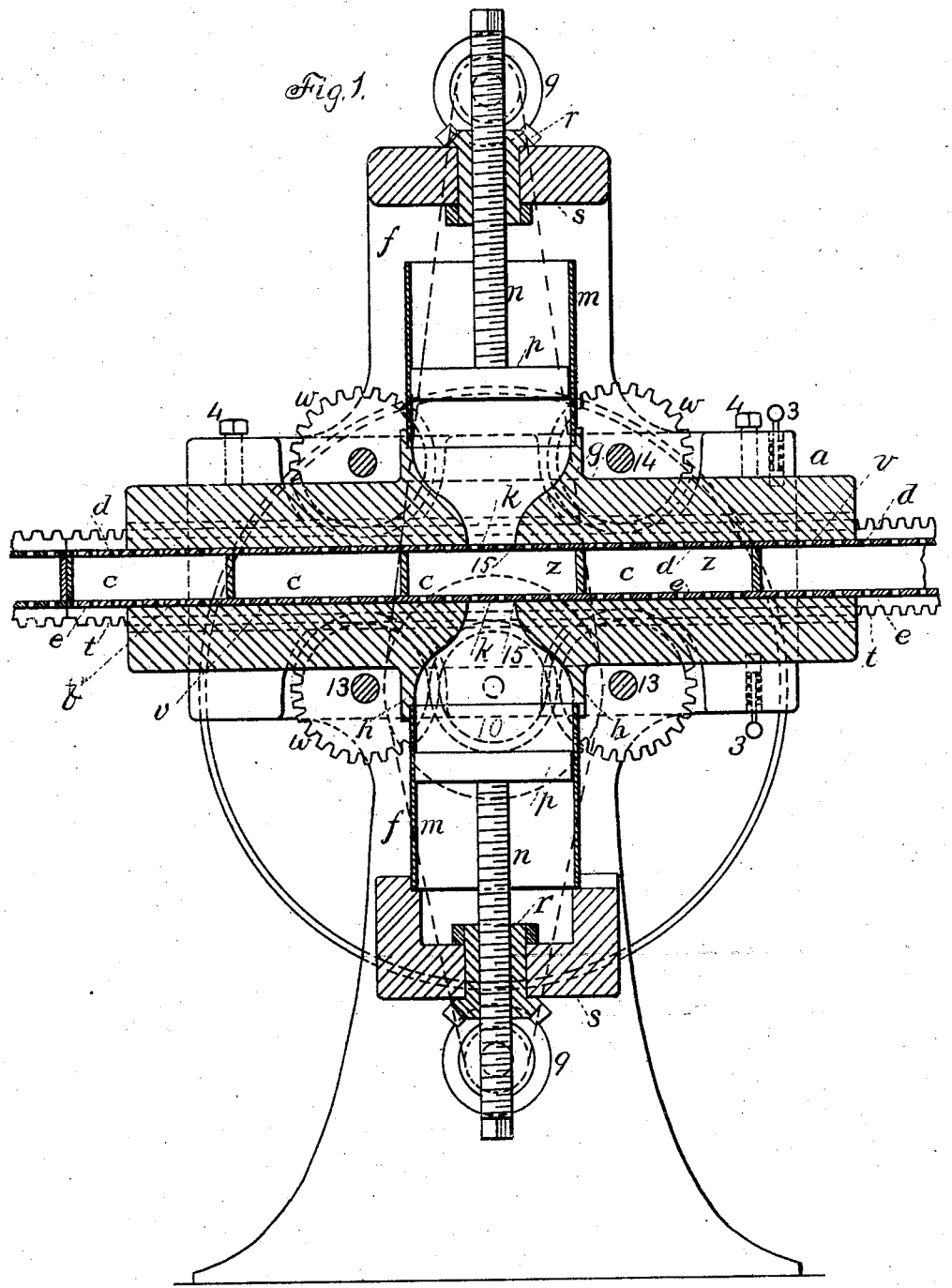

No. 878,154.　　　　　　　　　　　　　PATENTED FEB. 4, 1908.
H. D. PERKY, DEC'D.
L. SPARKS, ADMINISTRATOR.
MACHINE FOR MANUFACTURING CEREAL BISCUIT.
APPLICATION FILED APR. 2, 1906.

2 SHEETS—SHEET 1.

WITNESSES:　　　　　　　　　　　　　　　INVENTOR.
George M. Anderson.　　　　　　　　　　Henry D. Perky
Stuart Hilder.　　　　　　　BY　E. W. Anderson
　　　　　　　　　　　　　　　　　　　his ATTORNEY.

No. 878,154.
PATENTED FEB. 4, 1908.
H. D. PERKY, DEC'D.
L. SPARKS, ADMINISTRATOR.
MACHINE FOR MANUFACTURING CEREAL BISCUIT.
APPLICATION FILED APR. 2, 1906.
2 SHEETS—SHEET 2.
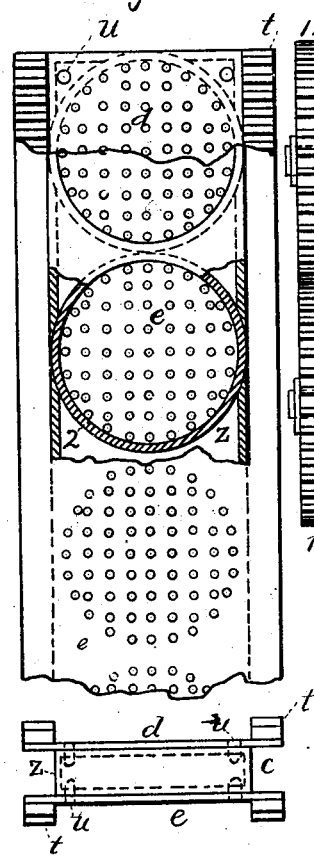
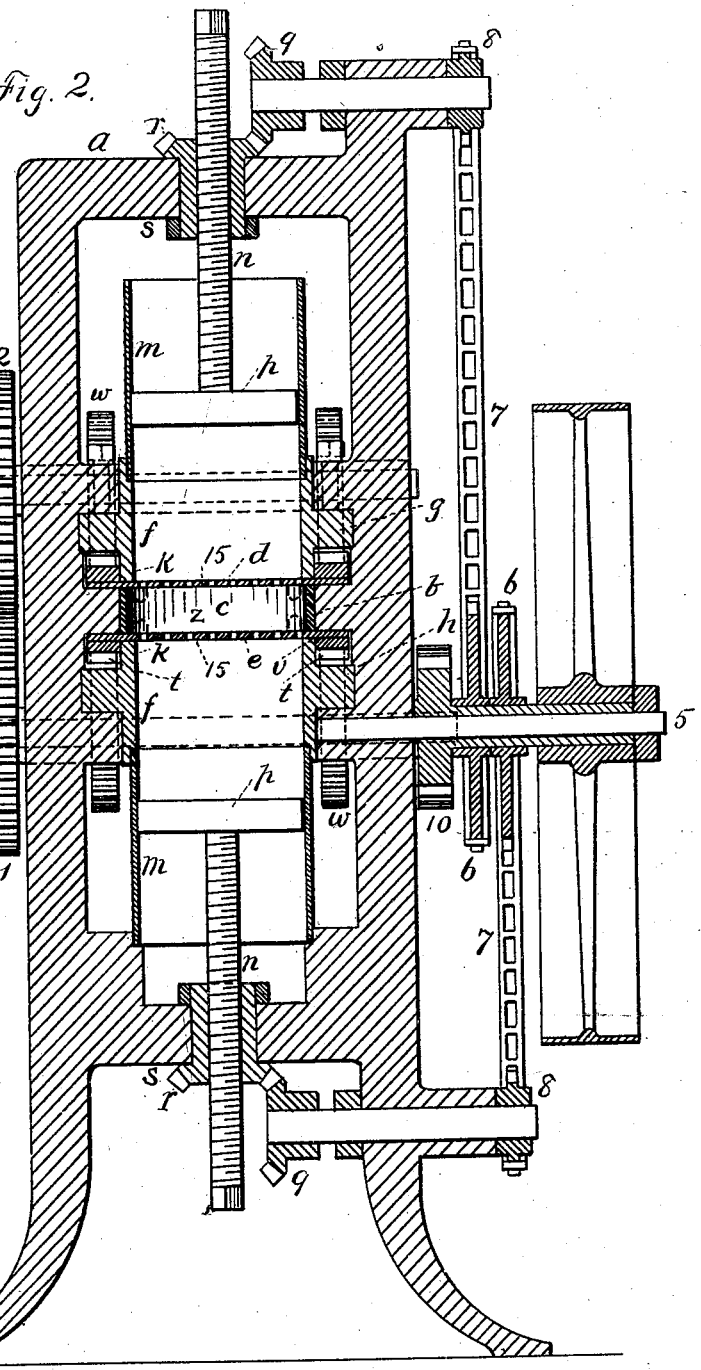
WITNESSES:
George M. Anderson.
Stuart Hilder
INVENTOR.
Henry D. Perky
BY E. W. Anderson
his ATTORNEY.

UNITED STATES PATENT OFFICE.

HENRY D. PERKY, OF GLENCOE, MARYLAND; LABAN SPARKS ADMINISTRATOR OF SAID HENRY D. PERKY, DECEASED.

MACHINE FOR MANUFACTURING CEREAL BISCUIT.

No. 878,154.     Specification of Letters Patent.     Patented Feb. 4, 1908.

Application filed April 2, 1906. Serial No. 309,278.

*To all whom it may concern:*

Be it known that I, HENRY D. PERKY, a citizen of the United States, and resident of Glencoe, in the county of Baltimore and State of Maryland, have made a certain new and useful Invention in Machines for Manufacturing Cereal Biscuit; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a vertical longitudinal sectional view of the machine. Fig. 2 is a vertical transverse sectional view of the same. Figs. 3 and 4 are detail views of the mold.

The object of the invention is the preparation of cereal food in a novel, palatable and attractive form, and it consists in the novel construction and combinations of parts, constituting mechanism for the purpose. For use in this machine the cereal material is provided in a solid but plastic form, by suitable grinding and cooking.

In the accompanying drawings, illustrating the invention, a form of machine is shown, which is designed to receive the material, and to reduce it to form by means of perforated molds.

The letter $a$, designates a frame having a slide-way $b$, extending longitudinally, for the passage of a molding or reducing pan $c$, having a removable perforated top $d$, and a removable perforated bottom $e$. The frame is also provided with seats $f$, above and below the slide-way $b$, for the insertion of removable press casings $g$, and $h$, respectively above and below said way and having their mouth portions $k$, facing toward the same. These press casings are preferably in axial line with each other, as indicated, and the cylinder portions in which the press followers $p$, move, open respectively, at the side, for the reception of removable feed cylinders $m$, which are designed to be charged with the material. Or, the material may be fed into chambers of the press casings. In the latter case the followers are made to fit the chambers of the press casings, instead of being made to fit the removable feed cylinders $m$, as shown. The follower screws $n$, extend, respectively, upward and downward, and engage gear nuts $r$, which are seated in bearings $s$, of the frame.

The top and bottom perforated plates $d$, and $e$, are provided with series of marginal teeth $t$, which are designed to be engaged by gear wheels $w$, which, under the operation of suitable driving power, are designed to cause these plates, and the intermediate body portion $z$, of the pan, to move in a rectilinear manner through the slide-way $b$, and along the faces of the press casings, said faces being indicated at $v$. The top and bottom perforated plates $d$, and $e$, may be held in engagement with the body portion of the pan by means of studs and sockets as indicated at $u$.

If the machine is made with a single press, one of the perforated plates may be solidly attached to the body of the pan. This body $z$, of the pan is designed to have openings 2, made in series therein, such openings being of circular or other form, as may be desired, according to the shape of the biscuit to be molded.

When the presses are charged with the material, and a pan is introduced into the slide-way, between the faces of the press casings, the machine may be put in operation. In charging the presses, the followers are run out of the press chambers, and the feed cylinders being removed from their seats, are replaced by charged feed cylinders. The removable press casings may be located in position by means of spring catches 3, and secured by means of set screws 4. The gear nuts, and gear wheels may be run by the same drive shaft 5, which is provided with sprocket wheels 6, for sprocket chains 7, engaging sprocket wheels 8, of the shafts of the gear wheels 9, which engage the gear nuts $r$. The same drive shaft carries the intermediate gear wheel 10, engaging the shafts 13, of the lower gear wheels $w$, which operate in moving the lower plate of the pan. By means of sets of gear wheels 11 and 12, the shaft 5 also communicates motion to the shafts 14, of the upper gear wheels $w$, which operate in moving the upper plate of the pan. The plates are thus designed to be moved directly and evenly.

The perforations of the pan plates, are usually of small diameter, and the plates are made of sheet metal, or of thin metal wherein the margins of the perforations have thin or cutting edges. As the material is fed to the perforations of the plates, it is reduced by them to thin elongated forms, which coming together from above and below, are designed to fill the molds of the pan with intermingled curved tendrils, the ends of which remain attached to the perforated plates. As the pan passes from the press mouths, these elongated forms are cut off by the lips 15, of said mouths. A succession of such pans may be passed through the slide-way, between the faces of the press casings so that the molded articles may be produced in a continuous manner. Each pan, as it comes from the press is designed to be placed in a drier for evaporation, after which the perforated plates may be loosened and removed and the articles discharged.

What I claim as my invention, and desire to secure by Letters Patent is—

1. A molding pan consisting of a body portion having the shape of the article desired and having a removable plane plate provided with reducing perforations.

2. A mold pan having removable top and bottom plates provided with reducing perforations.

3. A molding pan consisting of a body portion having an opening conforming to the shape of the article desired, and removable plane top and bottom plates having reducing perforations and means of engagement with said body portion.

4. A molding pan consisting of a body portion and a removable plane plate having reducing perforations, means of engagement with said body portion, and means of engagement with devices for moving the same.

5. A molding pan consisting of a body portion, and a removable plane plate having reducing perforations, and means of engagement with said body portion, in combination with means for moving said plate, and means for feeding material thereto.

6. The combination with a removable molding pan having a removable plane plate provided with reducing perforations, of means for giving said pan motion of translation, and means for pressing the material against said plate.

7. In a reducing machine, the combination with a movable molding pan having a plane plate provided with reducing perforations, a feed press extending at an angle to said plate and having its mouth adjacent thereto, and driving gear for moving said pan, and for operating said press.

8. In a reducing machine, the combination with a molding pan having a body portion provided with an opening of the contour of the article to be formed, and removable plane plates having reducing perforations, and means of engagement with said body portion, of mechanism for pressing the material against said plates.

In testimony whereof I affix my signature, in presence of two witnesses.

HENRY D. PERKY.

Witnesses:
PETER MULCAHY,
BESSIE MULLINEAUX.